(12) United States Patent
Nagle et al.

(10) Patent No.: US 9,168,999 B2
(45) Date of Patent: Oct. 27, 2015

(54) PROPELLER BLADE WITH INTERNAL STIFFENER

(75) Inventors: David P. Nagle, Westfield, MA (US); Paul A. Carvalho, Hadley, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 675 days.

(21) Appl. No.: 13/449,902

(22) Filed: Apr. 18, 2012

(65) Prior Publication Data

US 2013/0280084 A1  Oct. 24, 2013

(51) Int. Cl.
*B64C 11/26* (2006.01)

(52) U.S. Cl.
CPC ........... *B64C 11/26* (2013.01); *Y10T 29/49332* (2015.01)

(58) Field of Classification Search
CPC ........ B64C 11/22; B64C 11/24; B64C 11/26; Y10T 29/49332
USPC ....................... 416/224, 226, 227 A
See application file for complete search history.

(56) References Cited

U.S. PATENT DOCUMENTS

| | | | | |
|---|---|---|---|---|
| 2,259,247 | A * | 10/1941 | Dornier | 416/226 |
| 4,470,862 | A * | 9/1984 | More et al. | 156/245 |
| 4,806,077 | A * | 2/1989 | Bost | 416/226 |
| 5,248,242 | A * | 9/1993 | Lallo et al. | 416/226 |
| 2006/0097426 | A1* | 5/2006 | Luepke et al. | 264/259 |
| 2010/0092300 | A1* | 4/2010 | Jensen et al. | 416/233 |

* cited by examiner

*Primary Examiner* — Dwayne J White
*Assistant Examiner* — Brian P Wolcott
(74) *Attorney, Agent, or Firm* — Cantor Colburn LLP

(57) ABSTRACT

A propeller blade includes a foam core having a slot formed through it from a camber side to a face side, an internal stiffener disposed through the slot and including flanges in contact with both the camber and face sides and a structural layer that surrounds at least a portion of the foam core and in contact with the flanges on both the camber and face sides.

8 Claims, 4 Drawing Sheets

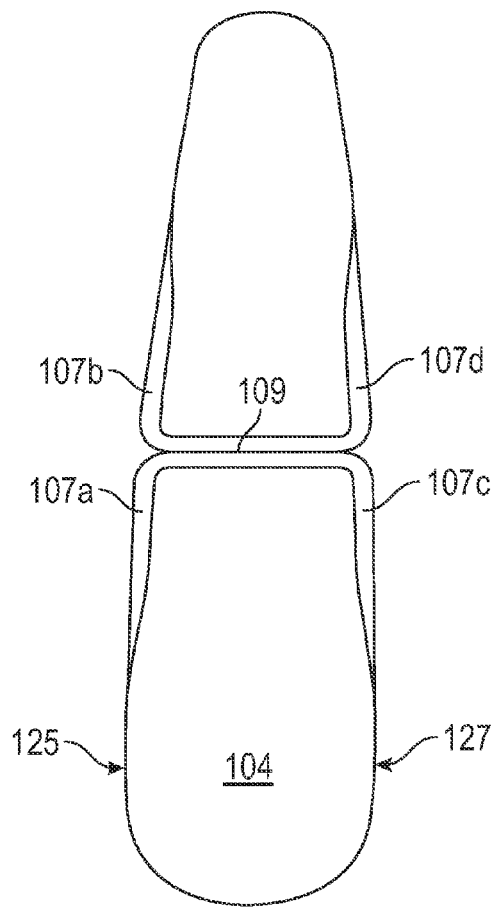 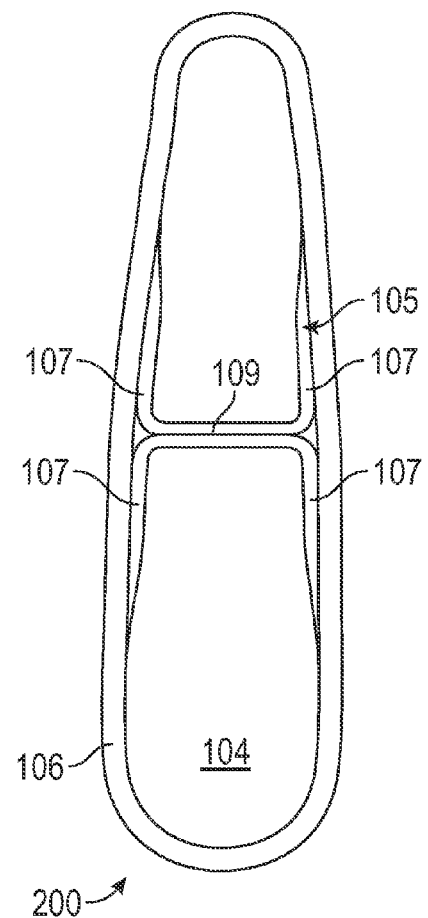
FIG. 3C
FIG. 3D

PROPELLER BLADE WITH INTERNAL STIFFENER

BACKGROUND OF THE INVENTION

The present invention relates to propellers and, in particular, to propeller blades that include an internal stiffener formed in them.

Modern propeller blades typically include root portions which extend into the hub arm of the hub of the propeller system and which are secured to and rotatable relative to the hub arm via a retention assembly. Typically the retention assembly includes one or a plurality of ball bearing assemblies which permit the rotation of the blade in the hub arm for accomplishing pitch change of the blade for altering the speed of the propeller and accordingly, the aircraft.

The blades are typically formed by surrounding a foam spar core with a resin impregnated fabric. Leading and trailing edges of the blade are then formed over the fabric and surrounded by, for example, a Kevlar sock. Such blades are light and effective for their intended purposes.

BRIEF DESCRIPTION OF THE INVENTION

According to one embodiment, a propeller blade that includes a foam core having a slot formed through it from a camber side to a face side is disclosed. The propeller blade of this embodiment includes an internal stiffener disposed through the slot and including flanges in contact with both the camber and face sides and a structural layer that surrounds at least a portion of the foam core and in contact with the flanges on both the camber and face sides.

According to another embodiment, a method of forming a propeller blade is disclosed and includes: providing a mold; forming a foam core in the mold that includes a face side and a camber side; forming a slot through the foam core that connects the face side and the camber side; placing an internal stiffener through the hole; folding the internal stiffener such that it includes at face flange that contacts the face side of the foam core and a camber flange that contacts the camber side of the foam core; and forming a structural layer that surrounds the foam core and contacts face and camber flanges.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIGS. 3A-3D show cross-sections of spar that may be used to form the propeller blade shown in FIG. 1 as it is being formed.

DETAILED DESCRIPTION OF THE INVENTION

Figure 1:
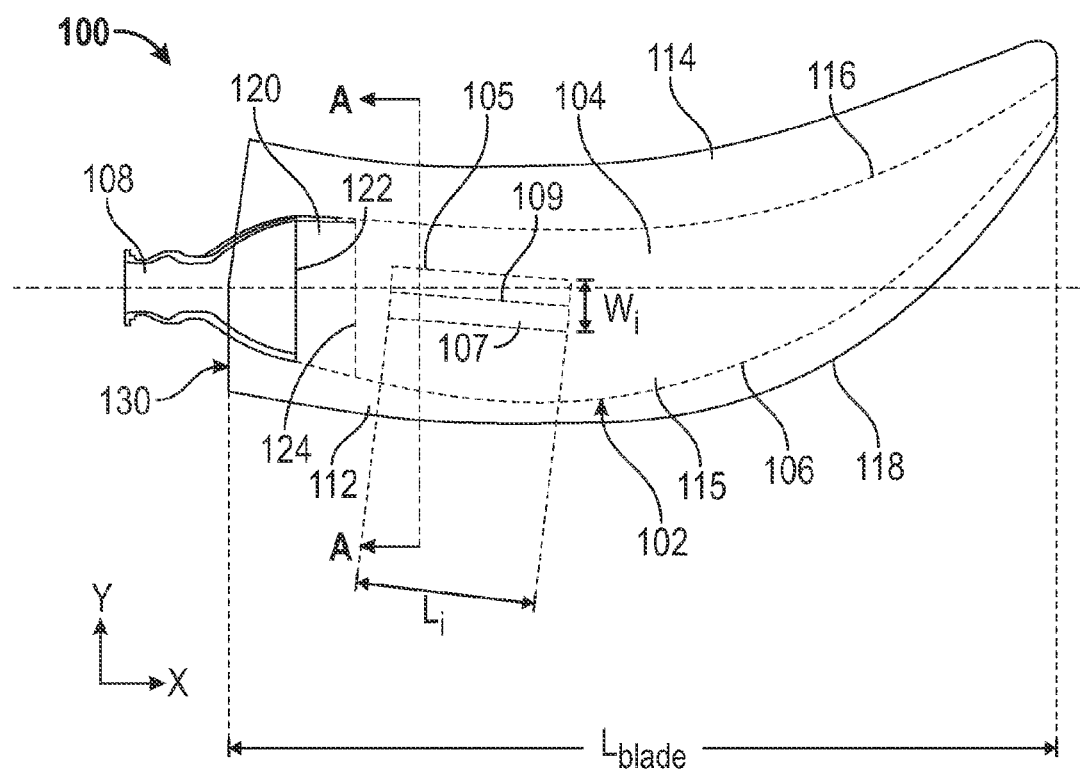
FIG. 1 is a plan-view of a propeller blade according to one embodiment of the present invention.
Figure 2:
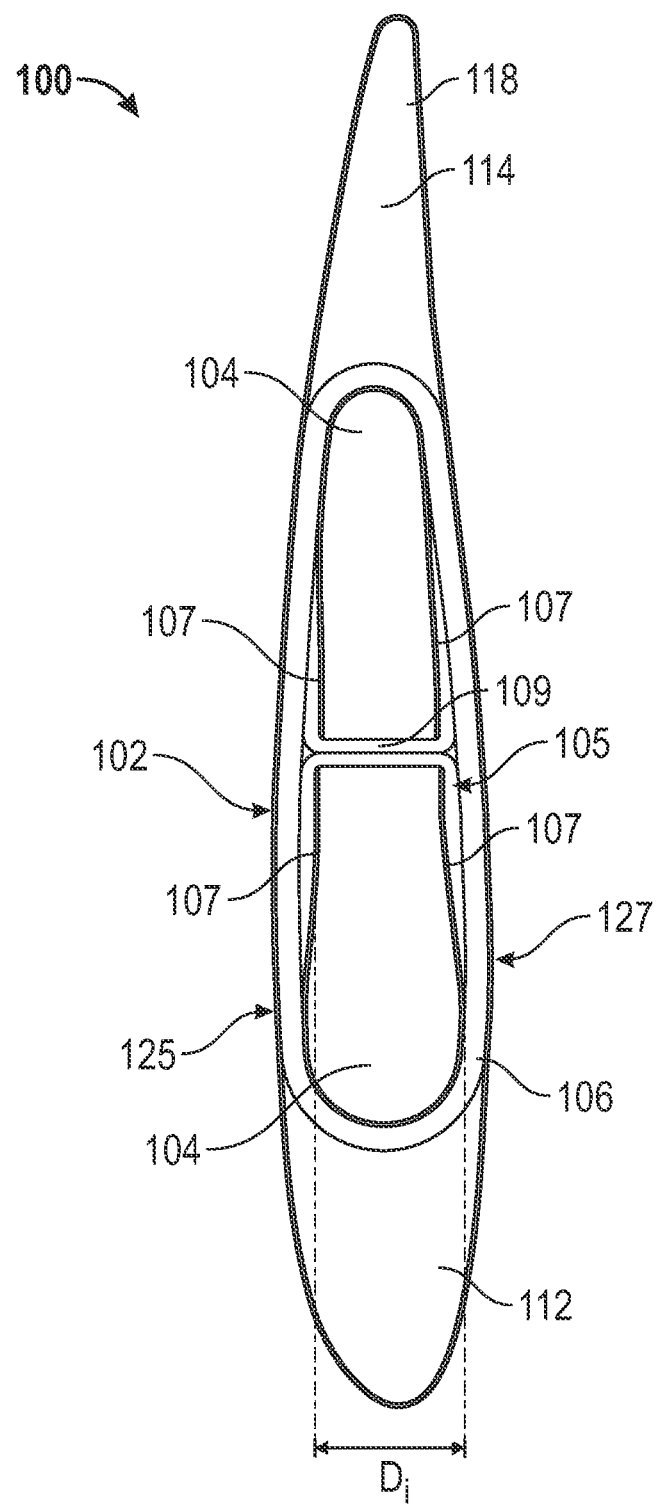
FIG. 2 is a cross-section of the propeller blade shown in FIG. 1.

Referring now to FIG. 1, a plan view of a propeller blade 100 according to one embodiment of the present invention is illustrated. Reference will also be made to FIG. 2, which is a cross-section of the propeller blade 100 of FIG. 1 taken along line A-A. In the following description, the direction shown in FIG. 1 by arrow X shall be referred to as the span wise direction and the direction shown in FIG. 1 by arrow Y shall be referred to as the chord wise direction.

The blade 100 is formed by first forming a spar 102. The spar 102 includes a spar foam core 104 surrounded by a structural layer 106. The core 104 is typically formed of a foam material that is injected into a mold but could also be pre-molded and machined and then inserted into the mold. The mold can include a layer of fiberglass or carbon (referred to as prepreg) on the walls thereof to which the foam of the foam core 104 adheres. As such, the foam core 104 can be surrounded by a layer of fiberglass or carbon (not shown) in one embodiment but this is not required. The foam that forms the core 104 can be selected from one of: polyurethane (PU), polyisocyanurate, or polymethacrylimide (PMI).

According to one embodiment, the blade 100 includes an internal stiffener 105 disposed therein. The stiffener 105 includes flange portions 107 generally located outside of the foam core 104 and inside of the structural layer 106. The flange portions 107 can be located on one or both of the camber and face sides 125, 127 of the blade 100 and are connected by a connecting portion 109. The connecting portion 109 is disposed through a slot formed in the core 104 and then bent to form the flange portions 107 as described in greater detail below. The stiffener 105 can be formed of carbon, fiberglass or any other suitable composite or non-composite material.

The structural layer 106 is typically formed of a dry braided carbon fiber which is subsequently resin injected, or a resin-impregnated fabric material (e.g. resin impregnated carbon fabric) and disposed such that it surrounds the core 104 (and the fiberglass layer if it is included). The structural layer 106 is typically braided onto the core 104. In some cases, the spar 102 is heated to set the resin in the structural layer 106. Considerable thermal stresses can occur in the core 104 as the spar 102 is cooled due to the differences in the coefficients of thermal expansion (CTE) of the core 104 and the structural layer 106.

It has been discovered that, in some instances, additional structure is required to transfer shear force from the face 127 and camber 125 sides of the blade 100 (or vice-versa) to prevent foam core 104 cracking. With the inclusion of the stiffener 105, the face 125 and camber 127 sides (FIG. 2) of the spar 102 in general (and the corresponding face and camber sides of the structural layer 106, in particular) are kept in a fixed relation to one another. As such, the possibility of the foam core 104 experiencing negative effects may be reduced.

In some instances, the spar 102 is formed such that a portion of it surrounds a root portion 108 that allows the blade 100 to be connected to a hub (not shown). Rotation of the hub causes the blade 100 to rotate and, consequently, causes the generation of thrust to propel an aircraft. In the following discussion, it shall be assumed that the blade 100 rotates in the clockwise direction. The root portion 108 is sometimes referred to as a "tulip" in the industry and is typically formed of a metal.

After the spar 102 is formed, leading edge foam 112 and trailing edge foam 114 are formed on the leading and trailing edges 115, 116 respectively of the spar 102. The leading edge foam 112, trailing edge foam 114 and the spar 102 can then be encased in an outer layer 118. The outer layer 118 can be formed of Kevlar and be in the form of a sock that is pulled over the assembly that includes the leading edge foam 112, trailing edge foam 114 and the spar 102. Of course, the outer layer 118 could be formed in other manners as well.

In some instances, to reduce weight, balance the blade 100, or both, a section of the core 104 is removed. In FIG. 1, the section is illustrated by void 120. That is, within the structural layer 106, void 120 is formed between an end 122 of the root 108 and an end 124 of the core 104. The void 120 can also extend into the root 108 in one embodiment. The void 120 can be formed by removing portions of the core 104 through the root 108. The void 120 can be created before or after any of the leading edge foam 112, trailing edge foam 114 and the outer layer 118 are formed.

The stiffener 105 can take on any number of shapes and, as illustrated in FIGS. 1 and 2 can have a length $l_i$, a width $w_i$, and a depth $d_i$. It shall be understood that depending on the shape and location along length the blade 100, the values $w_i$, and $d_i$ will generally vary to conform them to the desired shape of the blade 100. In one embodiment, the length $l_i$ spans a portion of the length of the blade 100 that is within the first half of the length $l_{blade}$ of blade 100 measured from the end 130 of the blade 100 where the root 108 is located. Of course, the length $l_i$ of the stiffener 105 can be any length that is less than the length $l_{blade}$ of the blade 100.

In one embodiment, and as best illustrated in FIG. 2, the stiffener 105 includes flange portions 107 on both the camber 125 and face sides 127 of the spar 104 that generally define the width $w_i$ of the stiffener 105.

FIGS. 3A-3D illustrate side views of an exemplary spar as it is being formed. The spar 200 is shown as a finished component in FIG. 3D and can be used to form a blade such as blade 100 shown in FIGS. 1 and 2. All of FIGS. 3A-3D are cross-sections taken of an assembly taken at the same location as line A-A shown in FIG. 1.

Figure 3A:
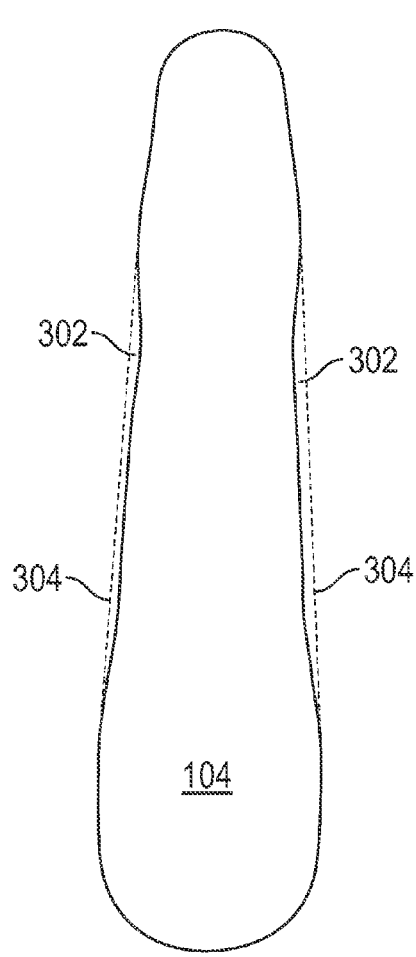

Referring now to FIG. 3A, a foam core 104 is illustrated. The foam core 104 can be formed in one of at least two different manners. In the first manner, the foam core 104 is formed in a mold such that is has an exterior shape defined by outermost lines, including dashed lines 304. Then, a machining process can be applied to remove portions, shown as recessed 302, that changes the exterior shape of the foam core 104 so that is defined only by the solid lines in FIG. 3A. Alternatively, peel plies or other elements could be placed in the mold such that foam core 104 is initially formed with shape indicated by the solid lines in the FIG. 3A. The peel plies can then be removed from the foam core 104 before processing of the foam core 104. In such an embodiment, a prepreg layer, or layers, may be disposed within the mold and internal to the peel plies to surround the foam core 104. It shall be understood that these prepreg layers can add additional support to the core 104, the amount of which depends on the number of layers. In one embodiment, the recesses 302 are sized and arranged to accept the flange portions 107 (FIGS. 1 and 2).

Figure 3B:
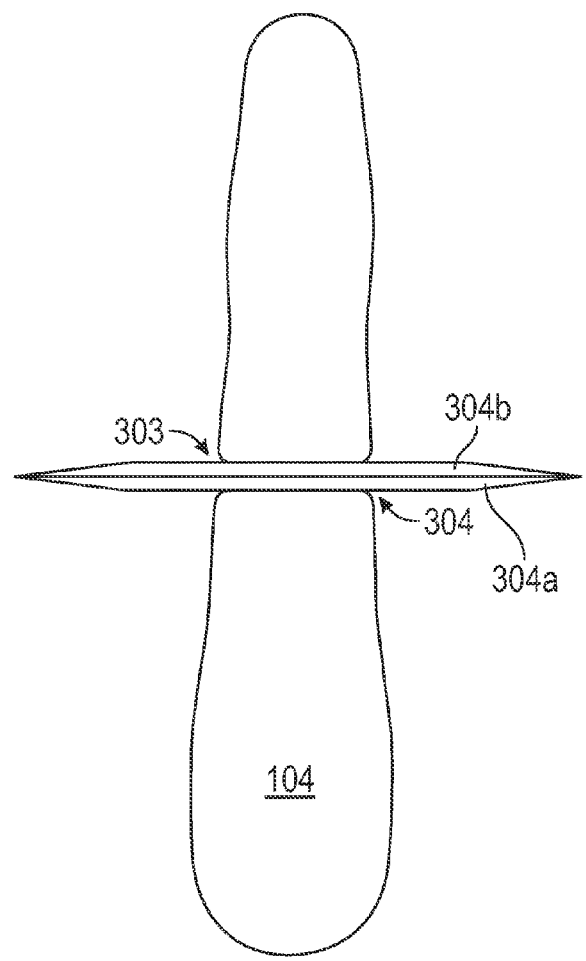

Regardless of how the foam core 104 is formed, a slot 303 is machined through the foam core 104 at the location where the stiffener will be placed and as is illustrated in FIG. 3B. A stiffener core 304 is then inserted through the slot 304. The stiffener core 304 could be a multilayer collection of sheets formed of dry carbon, fiberglass, or aramid cloth in one embodiment. In FIG. 3B two sheets 304a and 304b are shown as making up the stiffener core 304. Of course, the number of sheets could be varied in embodiment. In another embodiment, the stiffener core 304 could be formed of any type of material than could be separated into different portions.

Referring now to FIG. 3C, the spar foam 104 is shown after the stiffener core 304 has had portions thereof folded over on the face and camber sides of the spar foam 104. In particular, camber flanges 107a and 107b have been folded onto the camber side 125 such that they fill the recesses 302 (FIG. 3A) on the camber side 125. Similarly, face flanges 107c and 107d have been folded onto the face side 127 such that they fill the recesses 302 (FIG. 3A) on the face side 127.

After the flanges have been folded into the recesses, a structural layer 106 is braided over the assembly that includes the foam core 104 and the stiffener 105 (formed of connector 109 and flanges 107) as shown in FIG. 3D. The entire assembly of FIG. 3D can be resin injected and cured in the usual manner as described above.

As shall be apparent from the foregoing, embodiments of the present invention allow for the introduction of a composite, resin-injected stiffener 105 into the spar foam 104 which may provide additional structure/support within the spar foam 104 and for the spar 200 in general due to the connection of the of the face 127 and camber sides 125 of the spar 200 by the stiffener 105.

The stiffener 105 may be made from carbon, fiberglass, or other suitable composite material. The illustrated stiffener 105 described herein may generally be described as an I-beam, but it could also be a box-beam, or other suitable configuration. The stiffener 105 may be the full length of the blade 100, or its length may be optimized to reduce and weight.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of forming a propeller blade comprising:
 providing a mold;
 forming a foam core in the mold that includes a face side and a camber side;
 forming a slot through the foam core that connects the face side and the camber side;
 placing an internal stiffener through the slot;
 folding the internal stiffener such that it includes a face flange that contacts the face side of the foam core and a camber flange that contacts the camber side of the foam core; and
 forming a structural layer that surrounds the foam core and contacts face and camber flanges;
 wherein the internal stiffener is folded after being placed through the slot.

2. The method of claim 1, wherein the internal stiffener is formed of one of: carbon cloth, fiberglass, aramid cloth or a combination thereof.

3. The method of claim 1, wherein the foam core is formed of one or more of: polyurethane (PU), polyisocyanurate, and polymethacrylimide (PMI).

4. The method of claim 1, wherein the structural layer is formed of a resin-impregnated fiber material.

5. The method of claim 1, further comprising:
 injecting a resin into the structural layer, the face flange and the camber flange.

6. The method of claim 1, further comprising:
 placing peel plies in the mold;
 wherein the foam core is formed by providing a foam into the mold after the peel plies have been placed in the mold.

7. The method of claim 6, further comprising:
 removing the peel plies to form recesses in the mold on the face side and the camber side.

8. The method of claim 7, wherein the face flange is folded into the recess on the face side and the camber flange is folded into the recess on the camber side.

* * * * *